United States Patent Office 3,299,738
Patented Jan. 24, 1967

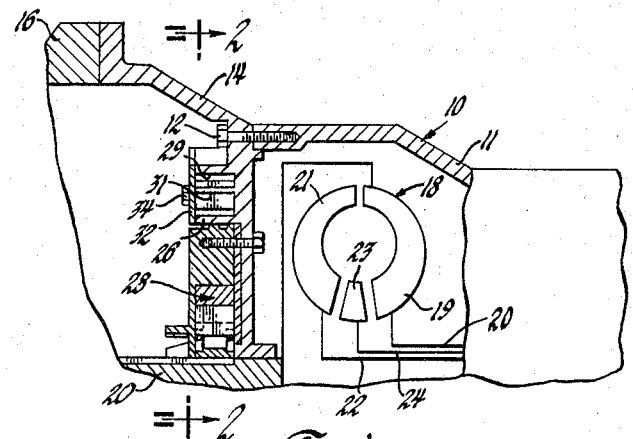

3,299,738
COOLANT SYSTEM
Darrel R. Sand, Plymouth, Mich., assignor to General Motors Corporation, Detroit, Mich., a corporation of Delaware
Filed Nov. 4, 1963, Ser. No. 321,317
1 Claim. (Cl. 74—606)

This invention relates to transmissions and more particularly to coolant systems for transmissions of the automatic type.

Present day automatic transmissions generally employ fluid drive units, such as hydrodynamic and hydrostatic drive units, to drivingly connect an engine to a load and variable ratio drive mechanisms, such as multiple ratio gear drive mechanisms, to extend the torque range of these fluid drive units. A typical automatic transmission having a hydrodynamic drive unit and a multiple ratio gear drive mechanism generally employs an engine driven pump receiving fluid, such as oil, from a source. The oil received by the pump is delivered under pressure to a transmission control system which controls the operation of the transmission where it is used as the working medium. In such arrangements, it is desirable to maintain the oil in the transmission control system within a predetermined temperature range and also the different parts of the transmission which are subjected to large heat rates during operation, since without sufficient heat transfer, transmission operation is adversely affected resulting in lower efficiencies and undue limitations on the power transmitting capacity.

Many attempts have heretofore been made to solve these heat problems. While these attempts have proven generally satisfactory, it has been found that such solutions do have disadvantages among which are that they either do not go directly to the source of some of the major heat problems, are intricate in design, are costly to manufacture or require a relatively large number of parts, to name a few. In large volume production especially, the cost of providing a satisfactory solution to these heat problems oftentimes unduly limits the availability to the general public of a highly efficient low cost product.

With the foregoing in mind, this invention as illustrated in one embodiment is employed in a fluid drive transmission for an engine driven vehicle. The transmission includes a transmission housing having a cover attached directly to the rear face of the engine and a transmission casing secured to the cover. A fluid drive unit disposed within the transmission casing drivingly connects the engine to a variable ratio drive mechanism to drive the vehicle wheels. The cover affords a housing or pump casing for an engine driven pump which supplies oil under pressure to the transmission control system. The pump casing is provided with both a coolant passage connected to the engine coolant system and an oil bypass passage, and these passages are adjacent each other and are closed by a cover plate. When the pump is operative, a portion of the oil under pressure is delivered to the aforementioned oil bypass passage and thence to the transmission sump, and the remainder is delivered to the transmission control system. The coolant passage is also circumjacent to and extends partially about the outer periphery of the pump. With the coolant and oil passages adjacent each other, the oil in the oil bypass passage is cooled prior to being returned to the sump by conduction through the walls of these passages to maintain the oil in the transmission control system within a predetermined temperature range. In addition, with the coolant passage adjacent the pump, the pump is caused to operate at a cooler temperature by conduction through the pump casing thereby reducing the temperature of the oil being pumped to aid in temperature control and reducing the leakage rate from the pump.

It is an object of this invention to provide an improved coolant system for a transmission.

It is another object of this invention to provide in an automatic transmission having a pump supplying fluid under pressure to a transmission control system, a coolant system cooling mainly by conduction the pump and the fluid supplied to the transmission control system.

It is another object of this invention to provide in an automatic transmission having a pump supplying fluid under pressure to a transmission control system, an oil bypass passage in the pump casing bypassing a portion of the oil under pressure from the pump and a coolant system employing a coolant passage adjacent the oil bypass passage effective to cool the oil being bypassed.

It is another object of this invention to provide in an automatic transmission for an engine driven vehicle employing a fluid drive unit and a transmission control system supplied by an engine driven pump, a transmission housing providing a casing for the pump, a coolant system having adjacent coolant and oil passages in the pump casing with the oil passage bypassing to a sump a portion of the fluid under pressure delivered from the pump and the coolant passage being connected to the engine coolant system, whereby the oil being bypassed is cooled prior to its return to the sump and the coolant passage extending circumferentially about the pump whereby the pump is caused to operate at a cooler temperature to reduce the leakage therefrom and reduce the temperature of the oil being pumped.

These and other objects of the invention will be more apparent to those skilled in the art fromt the following description of the preferred embodiment of the invention illustrated in the accompanying drawing in which:

FIGURE 1 is a partial sectional view taken through an automatic transmission having a coolant system embodying features of this invention.

FIGURE 2 is a partial enlarged cross-sectional view taken on the line 2—2 in FIGURE 1 illustrating the connections of the engine coolant system and transmission control system both of which are shown diagrammatically.

Referring to the drawing and particularly FIGURE 1, an automatic transmission generally designated at 10 includes a transmission housing having a transmission casing 11 secured by bolts 12 to a cover 14, the latter being directly and rigidly attached by bolts, not shown, to the rear face of an engine 16. A hydrodynamic drive unit of any suitable known type, such as the torque converter generally designated at 18, is disposed rearwardly of the engine 16 and is housed by the transmission casing 11. The torque converter 18 includes a torque converter pump 19 connected to an engine driven shaft 20, a turbine 21 connected to drive a turbine output shaft 22 and a stator 23 connected to a stator shaft 24. The torque converter pump 19 circulates the fluid counterclockwise to the turbine 21 which drives the turbine output shaft 22 in a forward direction. When fluid leaves the turbine 21 it is redirected to the pump 19 by the stator 23 in such a way as to assist in driving the pump 19. The turbine output shaft 22 and stator shaft 24 are connected to drive the vehicle through a suitable variable ratio gear drive arrangement, not shown, housed in the casing 11. One suitable variable ratio gear drive arrangement is shown in the application of August H. Borman, Jr., et al., S.N. 57,189, filed September 20, 1960, and entitled, Transmission.

Cover 14 affords a housing or pump casing 26 for a variable capacity pump generally designated at 28 which is driven by the engine driven shaft 20. Pump 28 is similar in function and detail to that shown in the patent of Walter B. Herndon, 2,875,699, entitled Variable Capacity Pressure System for Transmissions.

As best shown in FIGURE 2, pump casing 26 is provided with a coolant passage 29 circumjacent to and extending approximately halfway about the outer periphery of pump 28. Radially inwardly of and adjacent to coolant passage 29 is an oil bypass passage 31 provided in the pump casing 26. Both of the passages 29 and 31 are closed at the open face of the pump casing 26 by a C-shaped cover plate or jacket 32 which is secured by bolts 34 to the pump casing.

When pump 28 is operative, oil is drawn by the pump from a transmission sump 36 via a suction line 38, a suction passage 39, as shown in phantom line, and suction chamber 40, as shown in phantom line. Subsequently, by the action of the pump, oil is delivered under pressure to a delivery port in the pump, such as delivery port 41, shown in phantom line, for delivery via a supply passage 42, shown in phantom line, to the transmission controls and fluid elements in the transmission control system generally designated at 43 but a portion is returned or bypassed to the sump 36 via a bypass pressure delivery passage 44, a flow control orifice 45, a passage 46 connected to the upper end of the oil bypass passage 31, the oil bypass passage 31, a passage 48, shown in phantom line, connected to the lower end of oil passage 31, and a return line 49 connected to passage 48 leading to the sump. The transmission control system 43 controls the operation of the transmission in a desired manner such as in the manner provided by the control system shown in the aforementioned application of August H. Borman, Jr., et al., S.N. 57,189.

The engine coolant system includes an air cooled radiator or heat exchanger 51 having a coolant delivery line 52 connecting the lower end of the radiator 51 to the inlet of the circulating system of the engine 16 and a coolant return line 54 connecting the outlet of the engine circulating system to the upper end of the radiator 51. When a coolant circulating pump 56 in delivery line 52 is operative coolant is delivered to the engine circulating system and a branch delivery line 58 connected to line 52 downstream of pump 56. The branch delivery line 58 is connected to admit the coolant to the upper end of coolant passage 29 and the coolant after having passed downwardly through the coolant passage 29 is returned to the radiator 51 via a return line 59 connecting the lower end of coolant passage 29 to the coolant return line 54 of the radiator. The direction of oil and coolant flow is shown by the arrows.

The direction of fluid flow in passages 29 and 31 provides parallel-current flow. The direction of flow in passages 29 and 31 can be changed to provide counter-current flow for improved heat transfer. The oil being returned by oil bypass passage 31 is cooled by the coolant in the adjacent coolant passage 29 and mainly by conduction through the walls of these passages and maintains the oil temperature in the transmission control system within a predetermined range. To aid in the transfer of heat there are provided in coolant passage 29 and oil bypass passage 31 projections 61 projecting from the radially outward and inward side walls of these passages into the flow streams so as to provide large heat transfer areas and tortuous fluid paths. Since the coolant passage 29 partially surrounds the pump 28, the pump is caused to operate at a cooler temperature by conduction through the pump casing thereby aiding in reducing the temperature of the oil being pumped and reducing the leakage rate from the pump. The lengths of coolant passage 29 and oil passage 31 can be extended and made to completely surround the pump if more heat transfer from the pump is desired. The coolant passage 29 is located radially outward of oil bypass passage 31 to prevent radiation to the other parts of the transmission and for convenience of connections in the embodiment shown in the drawing and can be located inwardly of the oil bypass passage if desired with slight outward relocation of the oil passage for improved heat transfer between the pump and coolant passage.

The above-described preferred embodiment is illustrative of the invention which may be modified within the scope of the appended claim.

I claim:

In an automatic transmission for an engine driven vehicle, the combination of a transmission housing adapted to be secured to an engine, drive transmitting means housed in said transmission housing, a transmission control system operable to control the operation of said drive transmitting means utilizing fluid under pressure as a working medium, said transmission housing providing a pump casing, a pump housed in said pump casing operable to receive fluid from a source and deliver this fluid under pressure to a pump delivery port, fluid passage means in said pump casing for delivering fluid from said delivery port to said transmission control system and also for bypassing fluid directly to said source, said fluid passage means including a bypass passage extending at least partially about the periphery of said pump and continuously connected by a fixed flow control orifice to said pump delivery port so that a predetermined portion of the fluid pumped by said pump is continuously bypassed directly to said source, an engine coolant system, and a transmission coolant system including a coolant passage provided in said pump casing adjacent said bypass passage for receiving and returning coolant from and to said engine coolant system to cool the pump and the fluid being continuously bypassed by said bypass passage.

References Cited by the Examiner

UNITED STATES PATENTS

| | | | |
|---|---|---|---|
| 1,309,237 | 7/1919 | Bausman | 103—126 |
| 2,176,322 | 10/1939 | Barrett | 103—126 |
| 2,205,138 | 6/1940 | Gould | 230—210 X |
| 2,529,423 | 11/1950 | Schou | 74—761 |
| 2,737,061 | 3/1956 | Kelley | 74—677 |
| 3,146,630 | 9/1964 | Peters | 230—210 |
| 3,152,551 | 9/1964 | Ivey | 74—472 |

DAVID J. WILLIAMOWSKY, *Primary Examiner.*

J. R. BENEFIEL, *Assistant Examiner.*